March 29, 1960     E. WILDHABER     2,930,248
GEARING Filed Nov. 1, 1955     6 Sheets-Sheet 1

*INVENTOR:*
Ernest Wildhaber

March 29, 1960  E. WILDHABER  2,930,248
GEARING

Filed Nov. 1, 1955  6 Sheets-Sheet 2

*INVENTOR:*
Ernest Wildhaber

March 29, 1960 E. WILDHABER 2,930,248
GEARING
Filed Nov. 1, 1955 6 Sheets-Sheet 3

INVENTOR:
Ernest Wildhaber

March 29, 1960 E. WILDHABER 2,930,248
GEARING
Filed Nov. 1, 1955 6 Sheets-Sheet 4

INVENTOR:
Ernest Wildhaber

March 29, 1960  E. WILDHABER  2,930,248
GEARING

Filed Nov. 1, 1955  6 Sheets-Sheet 5

*INVENTOR:*
Ernest Wildhaber

United States Patent Office 2,930,248
Patented Mar. 29, 1960

2,930,248

GEARING

Ernest Wildhaber, Brighton, N.Y.

Application November 1, 1955, Serial No. 544,270

15 Claims. (Cl. 74—459.5)

The present invention relates to the tooth shape of gear pairs having axes disposed at an angle to each other. These gear pairs include bevel gears, whose axes intersect, and worm gears and hypoid gears, whose axes are offset from each other. Gears with angularly disposed and offset axes will be particularly described.

One object of the present invention is to device a new tooth shape for gears with angularly disposed and offset axes, that has a larger load carrying capacity than the tooth shapes now in use. A further object is to device a tooth shape of increased load capacity on a pair of hypoid gears, that makes it practically feasible to use more shaft offset, whereby also a more rigid mounting is attainable on the pinion.

Another object is to devise a tooth shape that can be easily and economically manufactured.

A still other aim is to devise a tooth shape for gears having angularly disposed axes, in which the tooth sides of each member of the gear pair have a shape such as is traced or described by a line moving along the tooth length, said line being inclined at an angle to the lengthwise direction of the teeth. The tooth surfaces are then the relative path of said moving line and can be described by a cutting edge corresponding to that line and moving lengthwise of each tooth at an inclination to the lengthwise direction of the tooth.

A still further aim is to devise a novel tooth shape for gears with angularly disposed and offset axes, such that the tooth surfaces of both members of a pair can each be described by a cutting edge that coincides with the line of instantaneous gear contact of the pair.

Another aim is to provide highly accurate tooth surfaces that can be described by a form-cutting edge on both members of a pair of tapered gears, where said form-cutting edge is concavely curved on at least one member of the gear pair.

A further object is to devise a tooth shape adapted to form-cutting both members of a gear pair having angularly disposed axes, by means of planing or shaping tools, so that projections at the small end of the teeth are feasible and do not have to be avoided at all costs.

Tapered gears ordinarily have tooth profiles that change along the teeth. A further object is to devise a tooth shape adapted to form-cutting of both members of a gear pair, that either avoids the previous requirement for change in profile shape along the length of the teeth, or achieves it with a form-cutting edge.

Another aim is to devise a tooth shape for tapered gear pairs with angularly disposed axes and teeth curved lengthwise, that permits cutting both members of the pair by moving a tool in a straight path across the fase of a rotating gear blank in direct proportion of the turning motion of said gear blank, and in controlling the profile curvature along the teeth by changing the position of the tool cutting edge, as it moves along the length of the teeth.

Other objects will appear in the course of the specification and in the claims.

These objects may be attained singly, or in any combination.

Embodiments of the invention will now be described with reference to the drawings, in which:

Figures 22 to 25 illustrate an application of the invention in the cutting of worm gearing.

Figures 26 to 28 show a modified application to worm gearing.

Fig. 26 and Fig. 27 are corresponding diagrammatic views showing the production of the worm gear, and defining its shape. Fig. 26 being a view taken at right angles to the axes of the worm and gear, and Fig. 27 being taken in the direction of the axis of the wormgear segment.

Figures 29 and 30 are plan and side elevational views, respectively, of the preferred pitch surfaces of a pair of hypoid gears, showing also the pitch lines made use of in an important embodiment of my invention. Fig. 29 is a vew taken at right angles to both axes, while Fig. 30 is a view taken along the gear axis, that is the axis of the larger member of the gear pair.

Figures 32 and 33 are auxilixary diagrams corresponding to Fig. 31; Fig. 32 being viewed in the same direction as Fig. 31, while Fig. 33 is a view taken in the direction of said line of contact.

Fig. 35 refers to one side of the teeth.

Fig. 37 refers to one side of the teeth.

The embodiment of Figures 1 to 6 will first be described. The mean plane of the contacting tooth zones of a pair of hypoid gears is the drawing plane of Figures 1 and 4, and is denoted at 70 in Fig. 2. It will be referred to as the pitch plane. The teeth of the gear, or larger member of the pair, are arranged in a zone diagrammatically shown at 71. It extends about the gear axis 72 that intersects the pitch plane at 73. The tooth zone of the pinion is indicated in dotted lines 74. It is inclined to the zone 71 of the gear. The opinion axis 75 intersects the pitch plane at 76.

Figure 1:
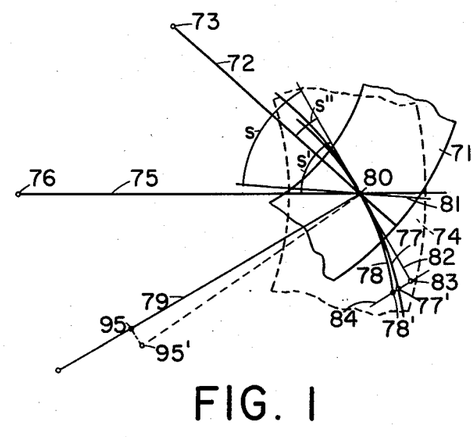
Fig. 1 is a view of the tooth zones of a pair of hypoid gears, serving to illustrate diagrammatically a principle underlying the present invention. The drawing plane is a mean plane of the tooth zones, ordinarily called the pitch plane.

The pinion- and gear-teeth extend lengthwise along curved lines 77, 78 respectively, that are tangent to each other and to the pitch plane at mean point 80 in the turning position shown.

We can consider pitch surfaces that contact each other along a line, and are surfaces of revolution coaxial with the gear axis and with the pinion axis respectively. 81 denotes the tangent to this line of contact. Lines 77, 78 lie on the respective pitch surfaces, and in all turning positions contact each other at their intersection with the line of contact of the pitch surfaces.

This concept of pitch surfaces is known from the series of my articles printed in 1946 in "American Machinist."

We may assume the pitch surfaces of one of the gears of a pair, and determine geometrically its line of contact with the pitch surface of the other gear; and then obtain the latter pitch surface by rotation of the determined line of contact about the axis of the other gear or member.

Assumption of a pitch surface determines the pitch lines (77, 78) when the tooth ratio is given, and represents a partial determination of the tooth surface.

Figure 2:
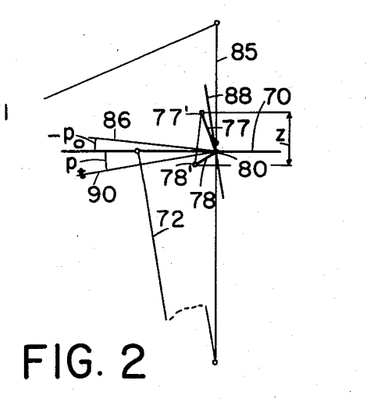
Fig. 2 is a diagrammatic side view corresponding to Fig. 1 and taken in the mean direction of the teeth, that is, in the direction of the tangent 82 of Fig. 1.

Fig. 2 is a view in the direction of the pitch line tangent 82 at mean point 80. The pitch lines 77, 78 are wrapped around the respective pitch surfaces. Consider their points 77', 78' that lie at a distance 80—83 (Fig. 1) from point 80, in a plane 84 perpendicular to the pitch-line tangent 82. When distance 80—83 is very small, infinitesimal, the curves 77, 78 coincide with their curvature circles in that region, and appear as straight-line portions in the view of Fig. 2, being viewed in the direction of the planes of said circles.

Except in some very special cases, the points 77', 78' of Fig. 2 are not directly in line with each other. The connecting line 77'—78' is not perpendicular to the pitch plane 70, but inclined to the pitch vertical 85 at an angle $p_0$. The pitch vertical 85 represents depthwise direction of the teeth at point 80. The depthwise direction of the teeth is at right angles to the pitch surface.

Line 86 (Fig. 2) is inclined at the same angle $p_0$ to the pitch plane. It passes thorugh mean point 80 and lies in the normal plane 79, that is in a plane perpendicular to the pitch-line tangent 82. I have called angle $p_0$ the limit pressure angle in the articles referred to, and line 86 the limit normal, and have shown that the limit normal 86 intersects the center line of the gear pair when the turning axes are at right angles. The center line is understood to be the shortest connecting line between the offset axes of the pair. It intersects both axes at right angles.

Figure 3:
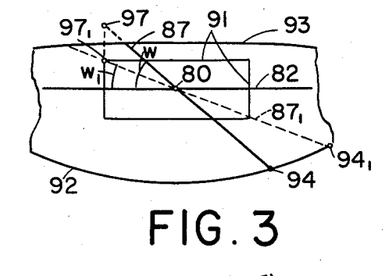
Fig. 3 is an enlarged view of the mean tangent plane of a pair of contacting teeth that correspond to Figures 1 and 2.

While their pitch lines contact at 80, the tooth surfaces of fully conjugate teeth contact each other along a line 87 best seen in Fig. 3. The straight line shown is really the tangent to the actual line, which may be curved. It is inclined at an angle $w$ from the pitch-line tangent 82.

*Comparative tooth surface capacity*

The load capacity of the contacting tooth surfaces of a gear pair depends on the surface stresses produced by a given load along the line of contact, and especially in the area around mean point 80. The larger the load to produce a given maximum stress, the larger is this surface capacity, which may be called the static surface capacity.

The ability of the tooth surfaces to carry load depends further on the action of the lubricant in operation. This surface capacity increases with the ability of the tooth surfaces to increase the thickness of the lubricant film under equal conditions. When comparing gear designs of equal dimensions, equal pitch lines, and equal mean profile inclination, the tooth design rates increasingly favorable the larger the film thickness is that exists with the same lubricant at the same speed.

The surface capacity is further affected by the lengthwise sliding of the teeth. But this factor need not be considered in a comparison between gear pairs having equal pitch lines, as all these gear pairs show the same amount of sliding.

We shall compare different designs of fully conjugate teeth, which have line contact with each other at any one turning position.

It can be demonstrated mathematically that the static surface capacity depends on the inclination ($w$) of the line of instantaneous tooth contact (87 in Fig. 3), and increases with increasing inclination $w$. It is proportional to sin $w$.

The larger the inclination $w$ the larger is the proportion of the tooth height used. Thus the line of contact 87 intersects the boundary 92 of the pinion tooth at a point 94, at a larger distance from the pitch-line tangent 82 than a line of contact $87_1$ of smaller inclination $w_1$. The latter intersects boundary 92 at $94_1$. The larger inclination $w$ therefore also results in a larger proportion of tooth depth utilized to total tooth depth. The tooth depth utilized represents the projection of the line of contact to the height direction of the tooth surface.

The surface capacity based on lubricant action increases still faster with increasing $w$. It is obvious that sliding lengthwise of the line of contact is ineffective for producing hydraulic pressure in an oil wedge at the contact region. Only the sliding component perpendicular to the line of contact is effective. It is the product of the sliding velocity and sin $w$. The effect also increases with increasing length of the line of contact and with increasing relative curvature radius.

Lubricating action is thus much more effective when $w$ is increased.

On gears with intersecting or with parallel axes this angle $w$, the inclination of the line of contact to the pitch line, depends only on the position of the tangent plane to the tooth surface at the considered mean point 80, that is on the pressure angle and spiral angle or helix angle at that point. Such gear pairs have equal angles $w$ when their tangent planes are equally positioned.

I have discovered that gears with angularly disposed offset axes do not have this restriction, and that the inclination $w$ can be increased by a twist of their tooth surfaces. This can be demonstrated mathematically.

In Fig. 3 a line of contact $87_1$, inclined at $w_1$ from the pitch-line tangent 82, may correspond to a gear having conical tooth sides. The axis of a conical tooth surface passing through point 80 may lie in the normal plane 79 that is perpendicular to the pitch-line tangent 82. This axis may be at 95 and extend at right angles to the drawing plane of Fig. 1.

Figure 4:
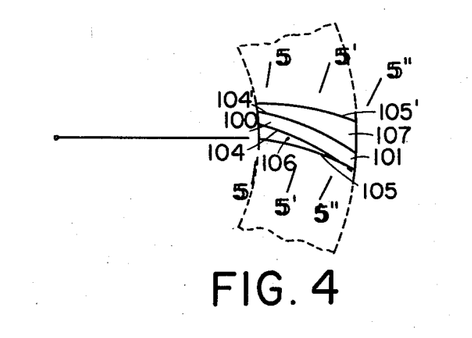
Fig. 4 is a view taken in approximately the same direction as Fig. 1, showing a tooth space of a hypoid gear constructed in accordance with the present invention.

Fig. 4 shows a tooth space of a gear having tooth sides adapted to give increased inclinations ($w$) of the lines of instantaneous contact and increased load capacity, in accordance with the present invention. The view is taken at right angles to the tooth bottom. The root lines 104, 104' at the tooth bottom appear inclined to the top lines 105, 105' in the manner shown. In accordance with this showing, the profile inclination or (normal) pressure angle varies along the teeth.

On the longitudinally convex gear-tooth side 106, the pressure angle is largest at the small end 100, and decreases towards the large end 101. It may even become zero at a point intermediate the ends 100, 101 and nearer to end 101. And it may become negative at the large end 101, as indicated in Fig. 4 by the crossing of the lines 104 and 105.

On the longitudinally concave side 107, the pressure angle is largest at the large end 101 and decreases towards the small end 100. Conventional hypoid gears of the formate type have a constant pressure angle in normal sections perpendicular to the root line or tooth bottom of the gear.

Figure 5:
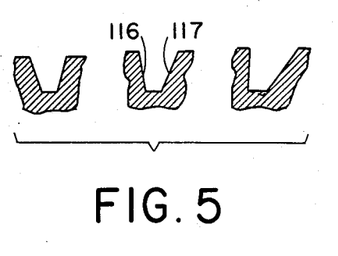
Fig. 5 is a group of sections taken normally to a tooth space, along lines 5—5, 5'—5', 5"—5", respectively, of Fig. 4.

Cross-sections of the tooth space are shown in Fig. 5. It is seen that the twist of the cross-sectional profile is in the same direction on both sides of the teeth, and that the included angle of the side profiles 116, 117 remains approximately constant along the teeth.

While the profiles 116, 117 are shown straight, they may also be curved if desired.

Figure 6:
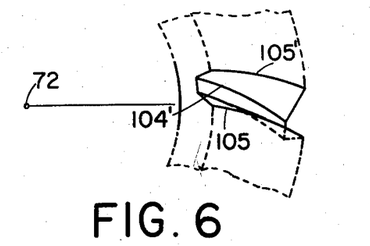
Fig. 6 is a view taken in the direction of the gear axis of the tooth space also shown in Figures 4 and 5.

Fig. 6 shows the same tooth space as Figures 4 and 5, in a view along the axis 72 of the gear.

*General production methods*

One member of the gear pair, either the gear or the pinion, may be cut with a cutting edge that describes the entire tooth surface in its final feed position, in a motion composed of a plurality of component motions. The mating member may be cut in a generating operation, in which a cutting edge describes a tooth surface of the first member, while meshing and rolling with a blank as if in operation.

Both members may instead be generated, if desired.

Also one or both members of a pair may be cut by envelopment with taper hobs without or with generation, and in many other ways.

Form-cutting methods applicable to both members will be specifically described hereafter. They have a bearing on the tooth shape.

*Applications*

Figure 7:
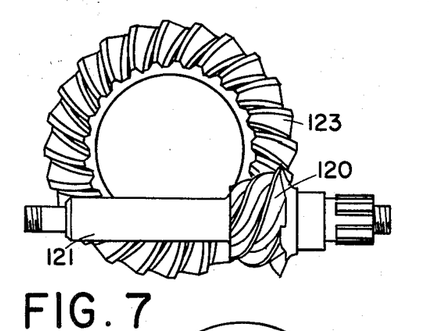
Fig. 7 is a view taken along the gear axis of a pair of hypoid gears constructed according to the present invention.

In addition to being an improvement, the present invention also makes possible design changes that were hitherto shunned. With the attained larger surface capacity of the teeth, larger shaft offsets may be used successfully on automotive drives. This results in increased pinion diameters and improves the breaking strength of the teeth. Also the pinion mounting can be improved. This is indicated in Fig. 7, which shows a hypoid pinion 120 with forwardly projecting shaft 121. This shaft can bypass the gear shaft because of the larger shaft offset used. It can be rigidly mounted on opposite sides of the pinion.

The shaft 121 may be formed integral with the pinion 120 when produced with reciprocatory tools, as described hereafter.

Pinion 120 meshes with a hypoid gear 123 that contains twisted tooth surfaces, as described.

Figure 8:
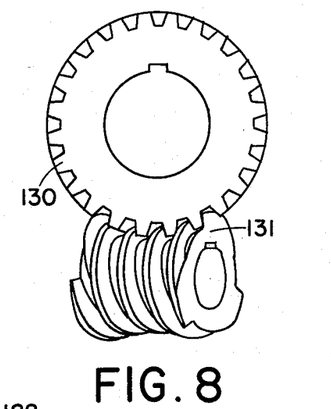
Fig. 8 is a view taken along the gear axis of an angular wormgear pair, as may be constructed according to the present invention.

The tooth shape of the invention is not confined to hypoid gears or to tapered gears, but is broadly applicable to gear pairs with angularly disposed and offset axes. It is also applicable to worm gearing, as indicated in Fig. 8. The gear pair shown consists of a worm gear 130 and an hourglass worm 131.

Specific tooth shapes will now be described, embodying the invention. One of these is suited especially for large shaft offsets; the other tooth shapes are preferred for lesser offsets, but can be used also with large offsets.

*Tooth shape I*

This tooth shape has a line of contact of fixed shape. As the members of the gear pair rotate, this line sweeps the tooth surfaces of both members, and in a 11 positions constitutes their line of instantaneous contact. This line extends across the working surface of a tooth from the tooth top to the lower tooth flank, and is inclined to the longitudinal direction of the tooth at an angle preferably in excess of thirty degrees, and ordinarily larger than forty-five degrees.

To explain this novel tooth shape for gears with angularly disposed and offset axes, the kinematics of such gears will be referred to.

Figure 9:
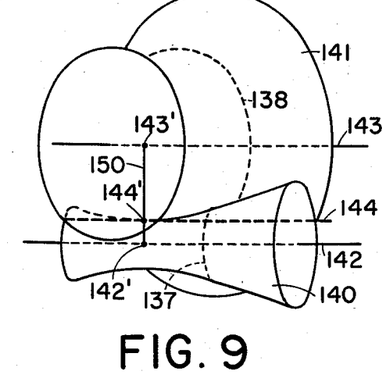
Fig. 9 and Fig. 10 are diagrammatic views in side elevation and in plan, respectively, of hyperboloidal pitch surfaces of a pair of gears having angularly disposed and offset axes, with their straight line of contact disposed in the drawing plane of each figure.
Figure 10:
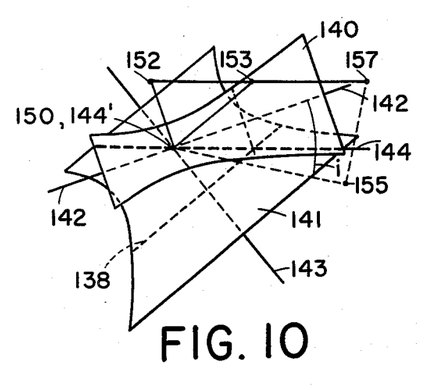

Figures 9 and 10 are views of the kinematic pitch surfaces 140, 141 of a pair of gears having offset axes 142, 143. The axes are shown disposed at an acute angle to each other, or at an angle other than a right angle, to keep the conclusions general, and not confined to right-angle drives.

Wormgears and hypoid gears have the same kind of kinematic pitch surfaces, and merely use different portions thereof, for instance the portions on opposite sides of the dotted circles 137, 138.

Figure 11:
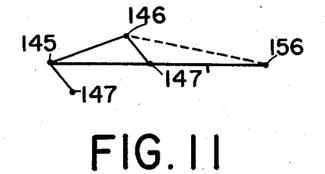
Figures 11 to 13 are explanatory diagrams.

The two rotary bodies with kinematic pitch surfaces 140, 141 move in each instant as if one were turned about an instantaneous axis 144 relatively to the other, and simultaneously moved along said axis in proportion to the turning motion, as known. The direction of the instantaneous axis 144 is obtained as if for intersecting axes, by vectorial addition: In Fig. 11 distance 145—146 is plotted in the direction of the pinion axis 142, and its length is made proportional to the turning velocity of the pinion, or to an angular pitch thereof. Distance 145—147 is plotted in the direction of the gear axis 143, and its length is made proportional to the turning velocity of the gear, using the same proportion as on the pinion. Line 146—147' is then drawn through point 146 parallel to 145—147 and equal in length to 145—147. Then line 145—147' is parallel to the instantaneous axis 144, and its length is a measure of the turning velocity about the instantaneous axis, at the above-said proportion.

The instantaneous axis 144 intersects the center line 150 of the gear pair. Line 150 is at right angles to both axes 142, 143 and is the shortest connecting line of these axes. It is perpendicular to the drawing plane of Fig. 10.

The location of the intersection point 144' of the instantaneous axis 144 and center line 150 is determined from the requirement that relative motion at this point is in the direction of the instantaneous axis, as it is at all points of the instantaneous axis. Point 144' has a distance $E'=144'—142'$ from the pinion axis 142; and a distance $E''=144'—143'$ from the gear axis 143, the two distances E' and E'' adding up to the total offset E of the axes 142, 143.

When point 144' is turned with the pinion, its velocity is proportional to the turning velocity of the pinion and to the distance E'. It is plotted in Fig. 10 as a horizontal distance 144'—152 that lies in a plane perpendicular to the pinion axis. When point 144' is turned with the gear, its velocity is proportional to the turning velocity of the gear and to distance E''. It is plotted in Fig. 10 as a horizontal distance 144'—153 that lies in a plane perpendicular to the gear axis. 152—153 is the relative velocity of the points 144' that move with the pinion and with the gear. Distance E' is so determined that 152—153 is parallel to the instantaneous axis.

When this is expressed in mathematical terms, the following equations can be derived, with p'=pitch angle of pinion=angle between instantaneous axis 144 and the direction of the pinion axis 142, see Fig. 10.
p''=pitch angle of gear=angle between 144 and 143.

$$E'=\frac{E \tan p'}{\tan p' + \tan p''}$$

$$E''=\frac{E \tan p''}{\tan p' + \tan p''} \quad (4)$$

The pitch surfaces 140, 141 contact each other along the instantaneous axis 144, as known. They are hyperboloids, obtainable by rotating the instantaneous axis 144 about the axes 140, 141 respectively.

Other toothed members can be made to mesh with the gears having pitch surfaces 140, 141. Many can mesh so that their teeth contact the teeth of said gears in all turning positions along the same lines as said gears contact each other. Such members have been called basic members. In their mesh they have the same kind of instantaneous relative motion as exists between the gears themselves. The crown gear, for instance, is a basic member for bevel gears having intersecting axes.

When gear axes are offset, the basic members are not gears in the conventional sense, which only turn, and in which the teeth are arranged in a circle about their turning axis. These basic members move axially, as they turn, in proportion to the turning motion. They represent helical toothed segments.

Tooth shape I is a direct application of the concept of basic members, members capable of contacting both members of a pair of hypoid gears or worm gears along the same lines during their mesh, along which they contact each other. These members will now be further described.

To contact along the said same lines, the pair composed of said member and either gear should have, in the first place, the same instantaneous axis as the pair of gears. On bevel gears with intersecting axes this is sufficient for a basic member, provided that its axis intersects the bevel gear axis at the apex. There the relative instantaneous motion is a pure turning motion about the instantaneous axis.

On gears with angularly disposed and offset axes the relative motion is at any instant a helical motion about the instantaneous axis, a motion about and along said axis. To define a basic member it is not sufficient to have the same instantaneous axis. The instantaneous helical motion should be a portion of the same relative motion that exists between the members of the gear pair. The proportion of the axial motion to the turning motion about the instantaneous axis should be the same. In other words: the instantaneous relative helical motion should have the same lead. If it does, then the considered member is a basic member.

To achieve this, the axis of the basic member should lie in a plane parallel to the axes (142, 143) of the two gears, and it should intersect the center line 150. 144'—155 (Fig. 10) is any assumed direction of the axis of a basic member, whose turning ratio and vertical position will now be determined.

This direction is plotted in Fig. 11 from point 146. It is shown in dotted lines, and is seen to intersect the extended instantaneous axis 145—147' at 156. The length 146—156 measures the turning velocity of the basic member, at the scale used in plotting the turning velocity of the pinion as a distance 145—146. Distance 145—156 measures the turning velocity about the instaneous axis, in the mesh between the assumed basic member and the pinion.

The scale is preferably so chosen that distance 152—153 of Fig. 10 is equal to distance 145—147' of Fig. 11. Distance 152—153 represents the velocity along the instantaneous axis for the turning velocity 145—147' about it. In the mesh between the basic member and the pinion the relative turning velocity is increased to a measure 145—156. Accordingly the relative linear velocity along the instantaneous axis should be proportionately increased. It is given by a distance 152—157 (Fig. 10) proportionately larger than 152—153 and equal to 145—156 of Fig. 11, because 145—147' equals 152—153. When point 144' moves with the basic member, it should move from 144' to 157.

The velocity 144'—157 is made up of a component 144'—155 in the direction of the axis of the basic member, and of a component 155—157 perpendicular thereto. The former represents the axial velocity of the basic member per turning velocity expressed by 146—156 of Fig. 11, and determines its lead. Distance 155—157 is the peripheral velocity of point 144' when this point is moving with the basic member. As the turning velocity of the member is known, it determines the distance of its axis from point 144'. The product of turning velocity and distance equals the velocity 155—157.

When this construction is expressed in mathematical terms, the following formulas can be derived for the offset $E_x$ of the axis of the basic helical segment from the axis (142) of the pinion, and the lead $L_x$ of said segment, at any angle $i$ included by its axis 144'—155 with the direction of the pinion axis (142).

With $p=(p'+p'')$=shaft angle of the gear pair $$E_x=\frac{1}{2}E\left[\frac{\sin p - \sin(p-2i)}{\sin p}\right] \quad (5)$$

$$\frac{L_x}{2\pi}=\frac{1}{2}E\left[\frac{\cos(p-2i)-\cos p}{\sin p}\right] \quad (6)$$

And if the shaft angle $p$ is a right angle, $p=90°$, $E_x=E_r$, $L_x=L_r$:

$$E_r = \frac{1}{2}E(1-\cos 2i) \qquad (5a)$$

$$\frac{L_r}{2\pi} = \frac{1}{2}E \sin 2i \qquad (6a)$$

It should be noted that the offset $E_x$ and the lead $L_x$ are independent of the tooth ratio of the gear pair. It can be shown that the axis of a basic helicoid is also the line of contact of a pair of hyperboloids coaxial with the axes of the gear pair. An infinite number of pairs of contacting hyperboloids can be drawn about a given pair of gear axes. They differ in the offset $E_x$ of their straight line of contact from the pinion axis, and in the angle ($i$) of said line. Each of these lines can be taken as the axis of a basic helical segment of the gear pair.

Figure 16:
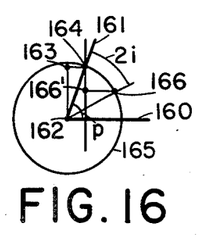
Fig. 16 is a diagram for determining the lead and shaft offset of a basic member, as may be used in my invention.

A simple geometric construction for determining $E_x$ and $L_x$ is shown in Fig. 16.

Draw a horizontal line 160 and another line 161 through point 162, line 161 being inclined at the shaft angle $p=(p'+p'')$ to line 160. Plot ½E on the vertical from 162 to 163, and intersect line 161 with a horizontal line passing through point 163, thus obtaining point 164. Its distance from point 162 is then $$\frac{E}{2 \sin p}$$

Draw a circle 165 through 164 about 162.

Then draw line 162—166 through 162 at an angle $2i$ to the radial line 162—164. Line 162—166 intersects the circle 165 at point 166.

From this construction it is seen that the horizontal distance of point 166 from the vertical line through 164 amounts $$\frac{E}{2 \sin p}[\cos(p-2i) - \cos p]$$

and represents $$\frac{L_x}{2\pi}$$

It is the distance of the points 166, 164 in horizontal direction. Their distance in vertical direction is equal to distance 166'—164 and amounts to $$\frac{E}{2 \sin p}[\sin p - \sin(p-2i)]$$

and equals $E_x$.

In this way the offset $E_x$ and the lead $L_x$ can be very quickly obtained for any angle $2i$; and the relationships can be recognized at a glance.

I have found that any line moving with a basic helical member describes tooth surfaces on the two members of a gear pair that contact each other along the different positions of said line. These tooth surfaces are conjugate to each other and adapted to transmit uniform motion. As the line is part of a basic member, it has the same kind of instantaneous relative motion with respect to the gear and with respect to the pinion, as the gear and pinion have between themselves, and contact exists along this line itself.

In accordance with tooth shape I of my invention, this line is inclined to the pitch surfaces, and extends from top to bottom of the teeth, at an angle preferably larger than 30 degrees to the lengthwise direction of the teeth. It sweeps the teeth of the rotating gears from one end to the other.

In one embodiment, the axis of the basic helical member that carries this describing line lies in the tooth zone itself. This axis is the line of contact of a pair of hyperboloids of revolution coaxial with the gear and pinion respectively. As the gear teeth extend along these surfaces of revolution, the latter will be called pitch surfaces. They are different from the kinematic pitch surfaces that contain the instantaneous axis, but in the tooth design more useful than those.

The describing line preferably intersects the axis of this basic member. The intersection point, the pitch point, then moves uniformly along the line of contact of the hyperboloidal pitch surfaces, when the gears turn uniformly on their axes and the basic member moves accordingly. As the pitch point does so, it traces spirals on the pitch surfaces of the gear and pinion. The said spirals contact at the moving pitch point, and extend there in the direction of relative sliding. The describing line tilts about the line of contact of the pitch surfaces as it moves along said line, in accordance with the lead of the basic helical member.

The hyperboloids 140, 141 of Figures 9 and 10 were introduced as the kinematic pitch surfaces containing the instantaneous axis 144. They can become the above described pitch surfaces for spiral teeth by changing the tooth ratio.

Figure 13:
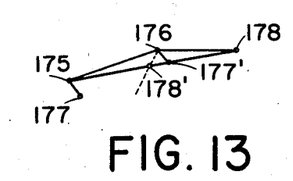

Fig. 13 is a vector diagram similar to Fig. 11, showing the turning velocities or angular velocities in this case. The turning velocity 175—177 of the gear is at a smaller proportion to the turning velocity 175—176 of the pinion than in diagram Fig. 11. This results in an instantaneous axis 175—177' including a smaller angle with the direction (175—176) of the pinion axis. To obtain pitch surfaces 140, 141 for the spiral teeth, we draw line 176—178 parallel to the line of contact 144 of the pitch surfaces, to intersect the extended instantaneous axis 175—177' at 178.

Figure 12:
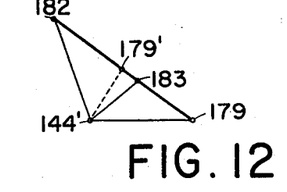

The tooth direction at point 144' is obtainable from Fig. 12, where 144'—182 represents the velocity of point 144' as it moves with the pinion, and where 144'—183 represents the velocity of point 144' as it moves with the gear. 182—183 is the relative sliding velocity and the tooth direction. The scale is so selected that distance 182—183 of Fig. 12 is equal to distance 175—177' of Fig. 13. The relative sliding between the basic member and the pinion is then given by a distance 182—179 equal to distance 175—178 of Fig. 13.

In a modification the direction of the axis of the basic member is inclined to the tooth zone. At a direction 176—178' (Fig. 13) of the axis of the basic member, its turning velocity is characterized by this distance 176—178'. The velocity of point 144', when moved with this basic member, is given by the direction and distance 144'—179' in Fig. 12, where 182—179' is equal to 175—178' of Fig. 13.

The describing line may be either straight or curved. The tooth surfaces of the two members of a pair are described by counterpart lines moving with the same basic member. When the describing line is curved, the tooth surfaces of one member of the gear pair are described by a concave curve, and the tooth surfaces of the other member are described by an identical convex curve.

For finishing the tooth surfaces, the describing line is embodied by a cutting edge. This edge sweeps the entire tooth surface in the final pass, and applies what may be called a form-cut thereto.

Figure 14:
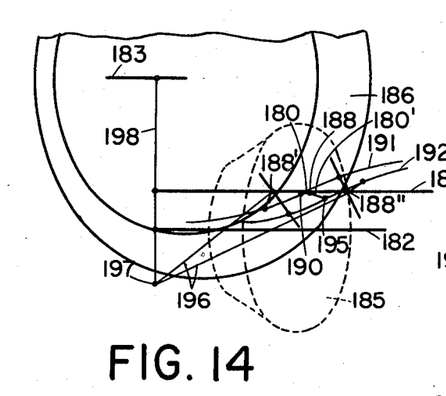
Fig. 14 is a view similar to Fig. 9, but referring to a hypoid gear pair having axes at right angles, and further illustrating the formation of mating tooth surfaces, according to one embodiment of my invention.
Figure 15:
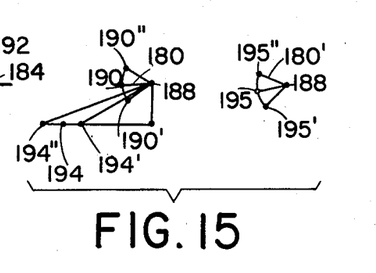
Fig. 15 is a view taken from the right of Fig. 14, along the straight contact line of the pitch surfaces. The two parts of this figure refer to opposite sides of the teeth.

Fig. 14 indicates the path of a straight describing line 180 or cutting edge, in a view taken at right angles to the line of contact 184 of the pitch surfaces 185, 186. Line 184 is also the axis of the basic member used. To avoid confusion, the describing line 180 is shown only from axis 184 up. While the pitch point 188 moves in a straight path 184, the outside point 190 moves in a helix. The describing lines 180, 180' for opposite tooth sides move along different helices 191, 192 of the same lead, the lead being identical with the lead of the basic member. While the pitch point moves to positions 188', 188, 188'', the outside point moves to positions 190', 190, 190''. Line 180 describes the tooth side that is longitudinally convex on the gear and longitudinally concave on the pinion. It is further shown at the left of Fig. 15, where 194', 194, 194" denote the intersections of the pinion axis 182 with planes perpendicular to path 184 and passing through the pitch points 188', 188, 188". Fig. 15 is a view taken along path 184. At the right in Fig. 15 the different turning positions of the describing line 180' are shown. The end point of line 180' moves to positions 195', 195, 195" as its pitch point moves to positions 188', 188, 188".

The pitch-line tangents, that is, the direction of the pitch line at the moving pitch point, are perpendicular to lines 196 (Fig. 14) passing through a fixed point 197 of the center line 198. This property will be further described. 188'—197 is one such line 196.

Figure 17:
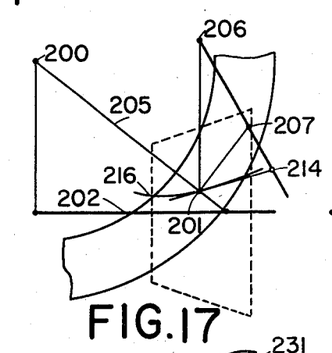
Fig. 17 is a diagrammatic and fragmentary view of a pair of hypoid gears using modified pitch surfaces, the view being taken along the gear axis.
Figure 18:
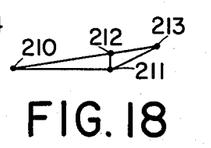
Fig. 18 is an auxiliary diagram corresponding to Fig. 17.

Fifiures 17 and 18 illustrate a modification where the axis of the basic member is inclined to the pitch surfaces. A mean point 201 of the contacting teeth then describes a helix in space, rather than a straight line. This mean path of contact extends at a constant distance about the axis of the basic member. As this helix is traced by a point of a basic member, that is a point of contact regardless of pressure angle, this helix is also the line of contact of a pair of surfaces of revolution coaxial with the axes 200 and 202 of the gear pair, as can be demonstrated mathematically. These surfaces of revolution can be considered the pitch surfaces. Their pitch lines slide on each other lengthwise, as they contact. Such pitch surfaces are no longer hyperboloids, and are differently tapered from those.

A desired given taper of the gear blanks may be achieved in this way, by using a basic member whose axis is inclined to the tooth zone. The mean point of contact 201 is first established, and the pitch vertical 205 passing through it. It is perpendicular to the tangent plane at 201 of the pitch surfaces, and intersects both axes 200 and 202 of the gear pair. The problem then is to determine the particular basic member that produces the given taper of the pitch surfaces.

We first determine the pitch-line tangent at mean point 201, that is the direction of the teeth. This can be done by plotting the projected velocity of point 201, when moving with the pinion, as a distance 201–206 in Fig. 17, and by plotting the velocity of point 201, when moving with the gear, as a distance 201–207. The pitch-line tangent at 201 is parallel to 206–207.

Then a diagram similar to Figures 11 and 13 is drawn, see Fig. 18, wherein 210—211 represents the turning velocity of the pinion, and 211—212 represents the velocity of the pinion, and 211—212 represents the corresponding turning velocity of the gear. 210—212 is the resultant direction of the instantaneous axis and the turning velocity about it, between the pinion and gear. The direction of the axis of the basic member can now be assumed, and plotted in Fig. 18 as a distance 211—213 that represents the turning velocity of this basic member. When the scale of the diagrams is chosen so that 206—207 of Fig. 17 is equal to 210—212 of Fig. 18, then distance 206—214 of Fig. 17 is equal to distance 210—213 of Fig. 18. And 201—214 represents the projected velocity of point 201 when moving with the basic member. Like the velocities at 201 of all basic members, it is contained in the plane of the velocities 201—206 and 201—207, that is in the pitch plane that is perpendicular to normal 205.

Pitch point 201 describes a helix portion 216 tangent to 201—214. The offset and lead of the basic member can be obtained with the equations already given.

Instead of assuming the direction of the axis of the basic member, we may assume the direction 201—214 of the line of contact of the pitch surfaces, and determine the direction of the axis therefrom.

Figure 19:
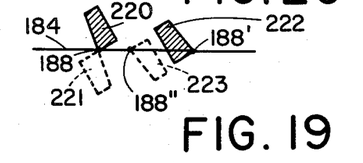
Fig. 19 is a diagram illustrating tools, which may be used, and their motion, in cutting gears according to an embodiment of the invention.

Diagram Fig. 19 refers to the embodiments where the pitch point or describing point moves in a straight path, like path 184 of Fig. 14. One tool, 220, is used on one member of the gear pair, and a counterpart tool 221 is used on the other member. Their cutting edges match and have a common pitch point 188 that moves uniformly along axis 184 while the gears turn uniformly on their axes. Simultaneously it is tilted about axis 184 with the basic member.

Because of the uniform motion a plurality of tools may be used on a cutting slide, if desired, such as tools 220, 222 on one member, and tools 221, 223 on the other member. Tools 220, 222 may cut with their outer edges containing pitch points 188, 188'. Tools 221, 223 cut with their inner edges containing pitch points 188, 188".

Teeth of tapering depth are obtainable in an exact way with straight cutting edges by moving a tool along its cutting edge, as it cuts. Any desired depth can be achieved in this way.

Figure 20:
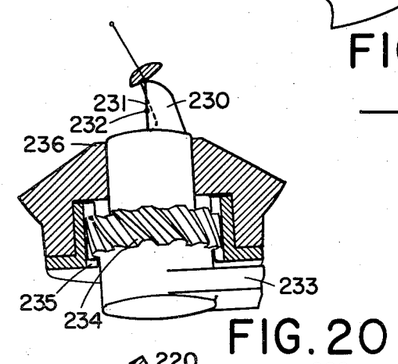
Figures 20 and 21 are corresponding views, shown partly in section, of a tool and its mounting, for cutting teeth of tapering depth, according to an embodiment of my invention.
Figure 21:
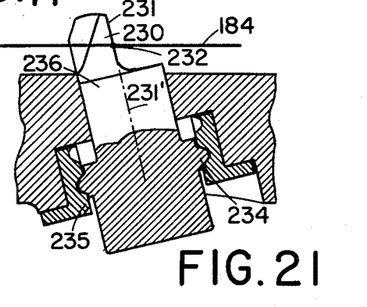

This is illustrated in Figures 20 and 21 which show a tool 230 with straight cutting edge 231 that intersects the axis 184 of the basic member at pitch point 232. The tool 230 contains an axis 231' that coincides with the extension of the cutting edge 231. At it cuts the tool 230 is moved along said axis to cut the required depth and it is also turned about axis 231' to attain a more nearly constant cutting clearance than would otherwise be attained. The main tool motion is along and about axis 184. The tool turning motion on axis 231' is in a constant proportion to the axial displacement along it. The tool is turned moderately through outside action on a lever arm 233. This turning motion displaces the tool axially through the contact of a helical gear 234 with an internal gear 235 that is rigidly secured to the tool carrier 236 The gear 234 may be formed integral with the body portion of the tool 230

In this way a desired tooth depth and a desired cutting clearance are attained together

*Application to worm gearing*

All the principles described are applicable also to worm gearing, which is then of the double-enveloping type. The use of hyperboloidal pitch surfaces is also applicable, even though the wormgear examples shown have other pitch surfaces. Worm gearing with very intimate contact can be achieved with my invention.

Figures 22 to 25 illustrate an embodiment in which the axis 300 of the basic member lies closer to the axis 301 (Fig. 25) of the gear member 302 than to the axis 303 of the worm 304. The pitch surfaces of the worm and gear are diagrammatically indicated in dash-and-dot lines. The axis of the basic member is here laid in the direction of the teeth at the mean pitch point, at point 144' of Figures 9 and 12. With the known direction of axis 300, its offset, the turning ratio and the lead of the basic member are determined as described and as shown in the diagram Fig. 16.

Figure 22:
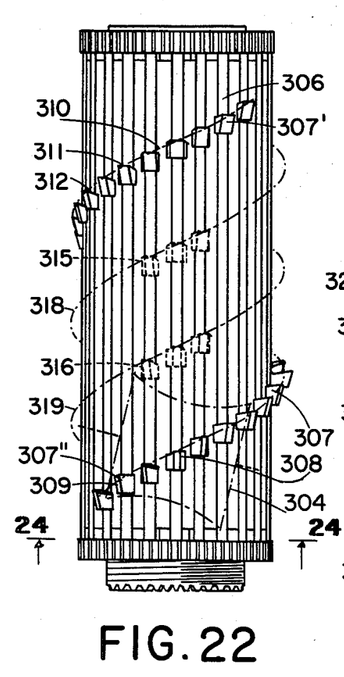
Fig. 22 is a side view of a tool assembly showing also the body of an hourglass worm in cutting engagement therewith, and defining both the tooth shape and the cutting process.
Figure 23:
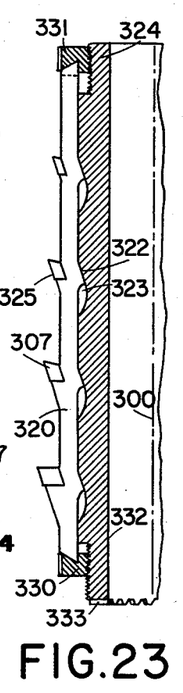
Fig. 23 is a fragmentary axial section corresponding to Fig. 22, showing also a tool bar carrying cutting teeth.

For cutting the worm the basic member is embodied by a tool 306 that has cutting teeth 307 arranged externally. The individual cutting teeth extend in the general direction of the axis 300 of the member, and are relieved on the sides 308 and tops 309. A large number of cutting teeth 307 are arranged side by side in a helix 310 about axis 300. The lead of this helix equals the known lead of the basic member. The leading or forward cutting teeth 307' have a reduced depth. The first tooth is just high enough to touch the outside of the worm blank, or to take off a small chip therefrom. The cutting teeth 307' gradually increase from tooth to tooth to a depth corresponding to the full depth to be cut. These teeth cut with their top edges 311, which are very wide at the start, and whose width diminishes as the depth of the cutting teeth increases. Their cutting faces are planes 312 inclined forwardly to give a front rake, thereby providing keen cutting edges.

The cutting teeth 307" adjacent the rear end cut with their side-cutting edges. Shown are two pairs of finishing teeth 307" sharpened with different cutting faces. The two teeth of each pair cut on opposite sides, the last teeth applying the finishing cut. Their cutting edges describe the entire tooth surfaces. These cutting edges are preferably straight.

Other rows 315, 316 of cutting teeth may be provided, and arranged along identical helices 318, 319 angularly spaced with respect to each other and to helix 310. Only one row cuts at a time. The different rows may be used successively to replace a row that has become dull.

On single-thread worms, the cutting teeth of one helix finish the entire worm in a single continuous helical pass, while the worm rotates and the tool moves helically about and along its axis.

Multi-threaded worms require indexing of the work and repetition of the tool stroke.

In the design illustrated the axially aligned cutting teeth or blades 307 are rigidly secured to a bar 320, as by brazing. Bar 320 bears against inclined bottoms 322 provided in the longitudinal slots 323 of the tool body 324. The inclination of the bottoms equals the inclination of the blade tops 325. Prior to sharpening the blades the bars 320 are adjusted lengthwise by means of end nuts 330, 331 that thread onto the tool body 324. The bars thereby move forwardly and also outwardly, so that the resultant displacement is along the relief surfaces of the cutting teeth. This permits to maintain a constant diameter of the tool. The tool has a bore 332, and is driven through a toothed face coupling 333.

Figure 24:
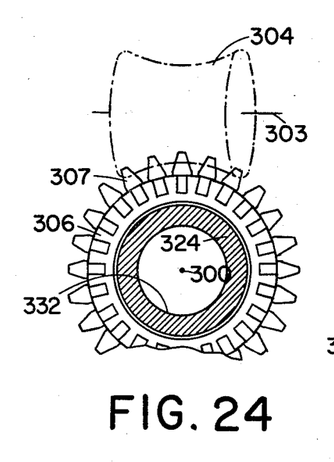
Fig. 24 is a view corresponding to Fig. 22 and taken axially of the tool assembly.

In the view along the tool axis 300, Fig. 24, the relief lines are omitted on the cutting teeth 307 for clarity.

Figure 25:
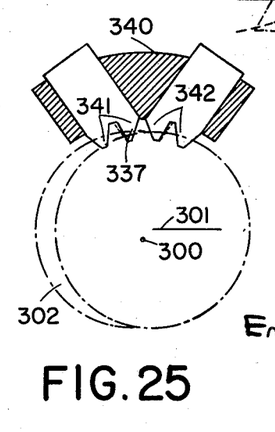
Fig. 25 is a view taken in the same direction as Fig. 24, but referring to the production of the wormgear.

When it comes to cutting the gear 302, the same basic member is used, but the cutting teeth 337 are arranged internally thereon. A segmental portion 340 of the basic member may be used. It contains two pairs of cutting teeth, 341, 342, for cutting opposite sides of the teeth. Each pair contains a depth-cutting tooth and a side-cutting tooth. In cutting, the gear 302 may be rotated uniformly and continuously on its axis 301, while the basic member 340 with cutting teeth 337 is stroked helically about its axis 300. It has a uniform motion during each cutting pass, and returns while clear of the work. It is gradually fed in depthwise, until full cutting depth is reached.

Figure 26:
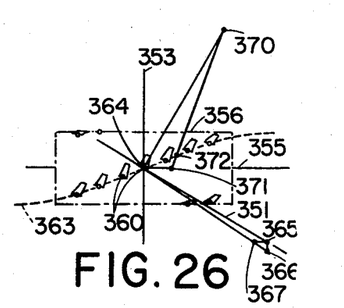
Figure 27:
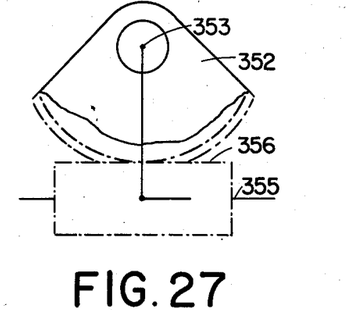
Figure 28:
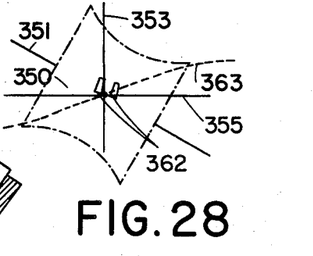
Fig. 28 is a digaram explanatory of the production of the mating worm.

A further application to worm gearing is illustrated in Figures 26 to 28. It contains an hour-glass type worm diagrammatically indicated at 350, with axis 351, and a cooperating wormgear segment 352 with axis 353. The axes 351, 353 are at an acute angle to each other. Here the axis 355 of the basic member 356 is displaced away from the tooth zone towards the worm axis 351. It so happens that it extends at right angles to the direction of the wormgear axis 353.

A member 356 with externally arranged cutting teeth is used for cutting the wormgear segment 352. The cutting teeth are diagrammatically indicated at 360 in Fig. 26. As many cutting teeth 360 are used as there are tooth spaces in the segment, so that a chip is taken in all tooth spaces in each helical stroke of the tool 356. Depthwise feed is provided, until full depth is reached. If desired, some feed about the wormgear axis 353 may be used at full depth, first in one direction and then in the other direction, for applying the finishing cut.

To cut the worm 350, a pair of cutting teeth 362 are arranged internally on the basic member with axis 355. This pair straddles a cutting tooth 360 that finish cuts the gear segment with both of its side edges. The cutting teeth 362 are moved in a helical path 363 across the face of the worm at a uniform rate, about and along the axis 355, while the worm blank rotates uniformly on its axis. It is seen that path 363 (Figs. 26 and 28) represents the mean path of contact of the worm and worm gear. It extends about the axis of the basic member at a constant distance therefrom. The cutting teeth 362 may be fed depthwise in the tool body, until full depth is reached, while the helical strokes are repeated.

Multi-threaded worms may be indexed, preferably after each helical stroke. Or else a plurality of pairs of cutting teeth 362 may be provided.

Fig. 26 shows the construction lines. 364—365, plotted in the direction of the worm axis, represents the turning velocity of the worm. The direction of the instantaneous axis and the turning velocity about it is represented by distance 364—366. Point 366 is obtained by plotting the turning velocity of the gear as a distance 365—366 in the direction of the gear axis, from 365.

The tooth direction at mean point 364 is obtained by plotting the velocity of point 364, as it moves with the worm, as a distance 364—370 perpendicular to the direction of the worm axis; and by plotting the velocity of point 364, as it moves with the wormgear, as a distance 364—371 perpendicular to the direction of the wormgear axis 353. 370—371 then represents the relative sliding velocity between the worm and wormgear at point 364, and the tangent to the tooth direction at that mean point. The scale is preferably so chosen that distance 370—371 equals distance 364—366.

We may then assume the direction of the axis 355 of the basic member, and draw line 365—367 parallel thereto, obtaining point 367 on the instantaneous axis 364—366. Distance 366—367 is then plotted from 371 on line 370—371, obtaining point 372.

364—372 represents the velocity of point 364 when it moves with the basic member. It moves in a helical path 363 tangent at 364 to straight line 364—372.

The offset of the axis 355 may be determined as described from a diagram like Fig. 16, and the lead of the basic member also. This lead will have to check with the lead angle determined above.

While I have described fully conjugate tooth surfaces, surfaces eased off at the tooth ends may be used and obtained by such slight modifications as are customary in the art.

Tooth shape II

Here the same pitch surfaces may be used as in tooth shape I, and especially hyperboloids of revolution contacting each other along a straight line. This is the same straight line that can be considered the axis of a basic member, whose offset $E_x$ from the pinion axis is given by Equation 5 or 5a. Its lead $L_x$ is given by equation 6 or 6a.

The lead $L_x$ decreases with decreasing shaft offset (E) and becomes inconveniently small at small offsets as compared with the size. The describing line of tooth shape I then has to be tilted excessively as it moves along the straight line of contact of the hyperboloidal pitch surfaces.

One aspect of tooth shape II is obtained by tilting the describing line less than required for tooth shape I. The describing line is then no longer a line of contact between mating teeth. It is inclined thereto and has a larger inclination to the lengthwise direction of the teeth.

Figure 29:
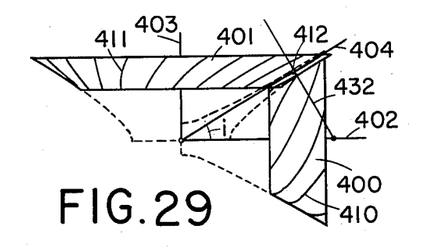
Figure 30:
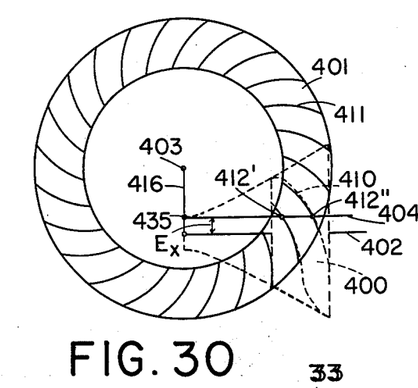
Figure 31:
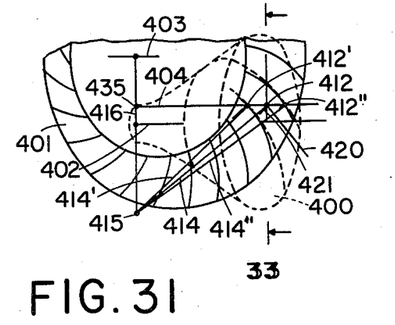
Fig. 31 is a view corresponding to Figure 30, the straight line of contact of the pitch surfaces lying here in the drawing plane, and further contains a diagram defining the direction of the teeth.

Figures 29 to 31 are corresponding views of hyperboloidal pitch surfaces 400, 401 of a pair of hypoid gears with axes 402, 403 at right angles. The pitch surfaces contact along a straight line 404 having a offset $E_x$ from the pinion axis 402, and being inclined at an agle $i$ to the direction of the pinion axis. Line 404 is preferably more inclined to the direction of the pinion axis than the instantaneous axis is. That is tan $i$ is larger than the ratio of the tooth numbers $n/N$ of the pinion and gear. Then, relative sliding is at an agle to line 404, at any point thereof.

Line 404 can be considered the axis of a basic member. As the gears rotate uniformly at the inverse ratio of their numbers of teeth, this basic member moves uniformly along its axis 404 as it turns. Any chosen point of its axis traces lines 410, 411 on the pitch hyperboloids. These lines can be used as pitch lines. They contact along the tracing point, 412′ or 412″ in Fig. 31.

Any line, straight or curved, that moves with the tracing point describes surfaces on the gear and pinion that contact at the tracing point. This is equally true when said line tilts about the tracing point as it moves along line 404, or whether it does not tilt but moves in a fixed position. Always the tangent to said line is tangent to said surfaces.

This line may tilt about axis 404 at a smaller rate than the basic member does, or it may tilt about any suitable other axis passing through the tracing point, or it may not tilt at all.

As pointed out in my said articles, the pitch lines 410, 411 are uniform-motion spirals. In the view of Fig. 31, taken at right angles to line 404 and to center line 416, the contacting pitch lines and their tangents appear perpendicular to lines 414', 414, 414" drawn from a fixed point 415 to a tracing point or pitch point 412', 412, 412". Point 415 lies on the center line 416 of the gear pair, the line that intersects both axes 402, 403 at right angles.

This center line and line 404 lie in the drawing plane of Fig. 31, and so do lines 414', 414, 414". These lines have a further significance in that they define the limit pressure angle. When the tangent plane to the contacting surfaces at any pitch point (412) is perpendicular to its connecting line 414 with point 415, that is when line 414 is the tooth surface normal, then this pitch point tends to stay in tooth contact when the gears turn. This results in tooth interference and should be kept away from.

How closely this limit condition can be approached without causing interference depends on the twist of the tooth surfaces. On conventional teeth without twist it is customary to stay away from the limit pressure angle by at least 15 degrees. When using as much twist as in tooth shape I, we can come almost up to the limit pressure angle without interference. The limit pressure angle may be reached at points 188', 188" (Fig. 14) somewhat outside of the gear face. On the longitudinally concave side of the gear teeth it is reached at point 188' beyond the inside end of the gear face. And on the longitudinally convex side of the gear teeth it is reached at point 188" beyond the outside end of the gear teeth. When, as here, we can keep clear of interference, the contact is the most intimate when the pressure angle is close to the limit pressure angle. Here we approach surface contact.

When less twist is used, we have to stay further away from the limit pressure angle, but can come closer to it than with conventional teeth.

If desired, a variable twist may be used lengthwise of the teeth, that is lengthwise of line 404, a twist that is the larger, the smaller the difference of the pressure angle and the limit pressure angle is. On the longitudinally concave side of the gear teeth the twist used is then largest near the small end of the teeth, while on the opposite side it is largest at the large end of the teeth. And it differs on the two sides of the teeth.

The describing line may be tilted about an axis coinciding with the path 404 of its pitch point; or it may be tilted instead about any other axis passing through the pitch point. 420, Fig. 31, is one such axis. It coincides with the pitch-line tangent at point 412, and moves with the describing point. Fig. 31 also indicates a describing line 421 of the longitudinally convex gear-tooth surface, from the pitch point up. In the position 412" of the describing pitch point the inclination of the describing line is smaller than in positions 412, 412'. And its projection increases in length from positions 412" to 412 to 412'.

For production the describing line is embodied as the cutting edge of a tool that is moved along line 404 and tilts as it moves. This tool (not shown) is relieved back of the cutting edge. As the tool moves along line 404, the inclination of the pitch lines to line 404 changes, and the tool relief or side clearance changes with it. The change between the pitch point positions 412' and 412" is approximately equal to the angle 412'—415—412". To reduce this variation of side clearance the tool could be tilted simultaneously also about an axis that appears vertical in Fig. 31.

Figure 32:
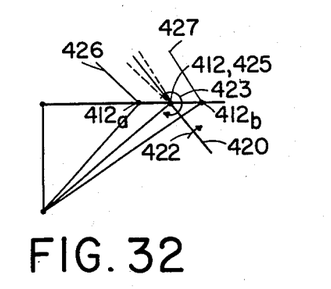
Figure 33:
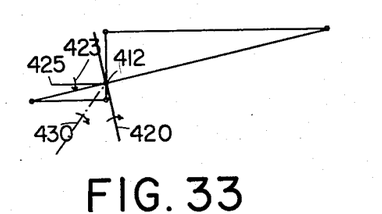

Figures 32 and 33 further illustrate this procedure, and the tooth shape obtained thereby, Fig. 32 being viewed in the same direction as Fig. 31. As the pitch point moves for instance from $412_a$ to 412 to $412_b$, the describing line is tilted about axis 420 in the direction of arrow 422, and it is also simultaneously tilted about a vertical axis 425 in the direction of arrow 423. The latter tilt is approximately equal to the angle included between the pitch-line tangents 426, 427 at points $412_a$ and $412_b$. Dotted lines passing through point 412 have been drawn in Fig. 32 parallel to these tangents, to show up the said angle directly.

When the turning motions about axes 420 and 425 are vectorially added, they give a resultant turning motion about an axis 430, Fig. 33. By tilting about this axis essentially the same effect can be attained as by simultaneously tilting about the two axes 420 and 425.

Figure 34:
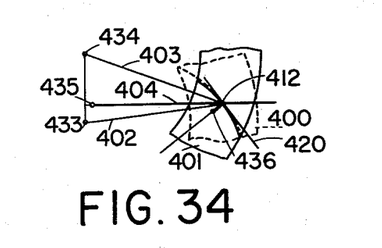
Fig. 34 is a view of the mean tangent plane of the pitch surfaces of the gears shown in Fig. 31, frequently called the pitch plane.

Fig. 34 is a view of the pitch surfaces 400, 401 taken in the direction of the pitch vertical 432 shown in Fig. 29, that is perpendicular to the contacting pitch surfaces at their mean point 412. The drawing plane is the tangent plane of the pitch surfaces at said point, and may be referred to as the pitch plane. The two axes 402, 403 intersect the pitch plane at points 433, 434, and it should be noted that these points lie on a line 433—434 perpendicular to the direction of the line of contact 404 of the pitch surfaces, and beyond point 435 of the center line 416.

Figure 35:
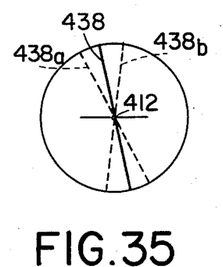
Fig. 35 is a view taken along the axis about which a cutting edge is turned as it moves along the line of contact of the pitch surfaces of a hypoid gear pair, showing the different angular positions of the cutting edge in its path along said line.
Figures 36, 37:
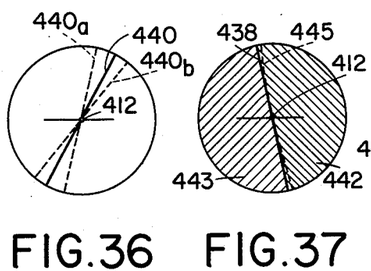
Fig. 36 is a view like Fig. 35, but referring to the opposite side of the teeth.
Fig. 37 is a view taken like Fig. 35 in the mean position of a cutting edge, and a section through surfaces so produced on a hypoid gear pair. These surfaces intersect along the cutting edge and are tangent to each other only at the pitch point. They interfere with each other increasingly with increasing distance from the pitch point.

Let us consider a describing line 412—436 passing through pitch point 412 and lying in the normal plane, that is in a plane perpendicular to the pitch-line tangent 420. As this line moves along the line of contact of the pitch surfaces, and ordinarily tilts as it so moves, while the two members of the gear pair turn on their axes in proportion thereto, the describing line sweeps and describes a pair of surfaces, one on the gear and another on the pinion. Fig. 35 is a view taken in the direction of the pitch-line tangent 420, showing the describing line 438, the same line as 412—436 of Fig. 34. It also shows different angular positions $438_a$, $438_b$ of the describing line in its path, and corresponding to positions $412_a$ and $412_b$ of the pitch point, Fig. 32. Fig. 36 is a view similar to Fig. 35, but referring to the opposite side of the teeth. It shows a describing line 440 moving from a position $440_a$ to a position $440_b$, or vice versa.

Fig. 37 is a normal section at mean point 412, taken perpendicular to the pitch-line tangent through teeth 442, 443. The surfaces described thereon by line 438 are tangent at the pitch point 412, but they intersect at all other points. They intersect at angles which increase with increasing distance from the pitch point 412. They penetrate into each other to distances about like the distances of the points of curve 445 from line 348, if imagined superimposed.

To obtain tooth surfaces which contact rather than intersect, one of the profiles, or both, should be made convex. Thus the profile of tooth 442 may be convex and extend along dotted line 445. This is further shown in Fig. 39, where profile 445 is shown in full lines as the describing line of the pinion tooth surfaces.

Figure 38:
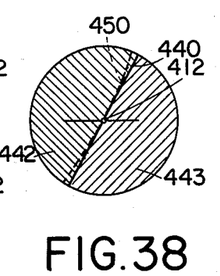
Fig. 38 refers to the opposite side of the teeth in the same way.
Figures 39, 40, 41, 42, 43, 44, 45:
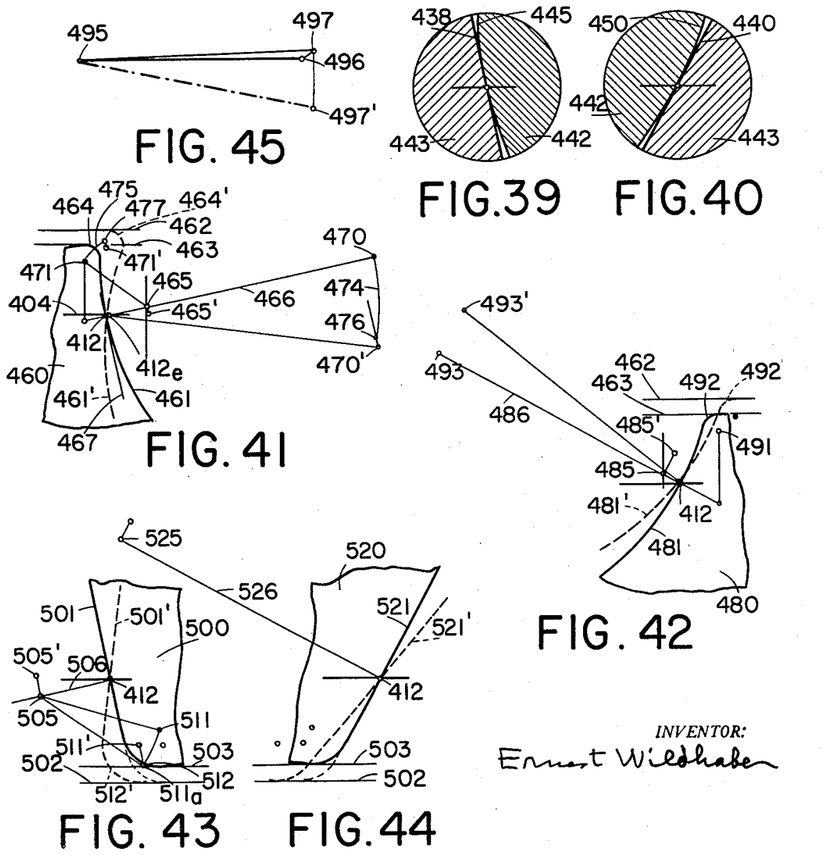
Figures 39 and 40 are sections like Figures 37 and 38 respectively, but showing relatively curved contacting profiles, so that interference is avoided and proper tooth action is attained.
Figures 41 and 42 are diagrams illustrating the use of concave cutting edges on teeth with tapering depth, that decreases from the large end towards the small end of the teeth. They are views taken in the direction of the axis on which the tool is tilted during the cutting pass, and refer to opposite sides of the teeth, respectively.
Figures 43 and 44 are diagrams like Figures 41 and 42, but illustrating the use of straight cutting edges, as may be done on the gear.
Fig. 45 is an auxiliary diagram explanatory of how the direction of the tool motion may be determined on teeth of tapering depth.

The opposite side of the teeth is illustrated in Figures 38 and 40. The tooth surfaces described by line 440 are tangent at the pitch point 412 and intersect at all other points. The penetration of the surfaces is shown by curve 450. Tooth surfaces that are tangent to each other throughout should have relatively curved profiles 440, 450, Fig. 40. A concave describing line 450 should then be used for finishing tooth 442 on that side.

The curvature to be used can be either computed, or it may be determined experimentally after the pitch surfaces have been computed in the way described, and the gear blanks have been established. A straight describing line may be used for instance on the gear member, and an assumed concave describing line on the pinion. A running test will then show whether the describing line should be made more concave or less concave. Experienced operators can judge from the first test about how much of a change should be made.

Tapering tooth depth and ease-off

Tapering tooth depth can be obtained by a slight modification of the procedure. Figures 41 and 42 show how opposite sides of the pinion teeth can be cut with a tooth depth that increases from one end of the teeth to the other; and Figures 43 and 44 refer to the gear teeth, where straight cutting edges may be used.

Of course, straight cutting edges could be used on the pinion instead, and concave ones on the gear.

Figures 41 to 44 are views taken in the direction of the tilt axis, for instance the pitch-line tangent 420 of Figures 31 and 34. The cutting edges are assumed to lie in a plane perpendicular to the tilt axis.

Fig. 41 shows a tool 460 with concave cutting edge 461 in its mean position at pitch point 412. Dotted lines 461' indicate the cutting edge in its position at the outer or large end of the teeth. It reaches to an increased depth defined by line 462, while edge 461 cuts to a depth defined by line 463. East-off lengthwise of the teeth can be achieved by causing the edge 461' to pass through a point $412_e$ instead of 412, at a distance from point 412 equal to the ease-off desired. Edge 461' can now be drawn at the required angle through point $412_e$ and touching line 462 with its edge round 464'.

The same position can be attained by turning edge 461 about an axis 465 lying on the profile normal 466, and by also moving it in the direction of the profile tangent 467. Axis 465 is parallel to the original tilt axis that passes through 412.

To determine the position of axis 465 on normal 466, line 470'—476 is drawn through the curvature center 470' of profile 461' parallel to the profile tangent 467. And line 471'—477 is drawn through the center 471' of the edge round 464', also parallel to the profile tangent 467. Then a position of axis 465 on normal 466 is assumed, and circular arcs 474, 475 are drawn about axis 465 through the curvature center 470 of profile 461 and through the center 471 of edge round 464. Arc 474 intersects line 470'—476 at point 476. Arc 475 intersects line 471'—477 at 477. The position of axis 465 is shifted along the normal 466 until the angle 470—465—476 of arc 474 is equal to the angle 471—465—477 of arc 475.

A large magnification should be used when working on the drawing board, to insure sufficient accuracy. The above steps can also be expressed in mathematical terms for computation. Indeed with computation it is found possible to arrive at the solution directly, without trial.

Fig. 42 refers to the opposite side of the pinion teeth. A tool 480 with concave cutting edge 481 is used, that is tilted to a position 481' at the large end of the teeth. Its edge round 492 with center 491 is then in a position 492', where it is tangent to the required depth line 462.

The curvature center 493 of profile 481 has then moved to a position 493'. Cutting edge position 481' can be arrived at by turning edge 481 about an axis 485 that lies on the profile normal 486, and by moving it in the direction of the profile tangent at pitch point 412. Axis 485 then gets into a position 485'. The procedure of determining the position of axis 485, the displacement 485—485', and the tilt about said axis is analogous to the procedure already described with Fig. 41.

The displacement along the profile tangent, 465—465' in Fig. 41 and 485—485' in Fig. 42, is in direct proportion to the displacement of the pitch point along the line of contact (404) of the pitch hyperboloids, and in direct proportion to the turning angle of the work being processed. If it were not for this displacement, the tilt axis 465 or 485 would also move in the direction of axis 404 a distance equal to the displacement of the pitch point. This latter displacement is represented in Fig. 45 by a distance 495—496, Fig. 45 being a view taken in the same direction as Fig. 34. To this displacement is now geometrically added the displacement 496—497 in the direction of the profile tangent. This displacement is foreshortened in Fig. 45, as the profile tangent is inclined to the drawing plane. The displacements add up to a resultant displacement 495—497 inclined to the drawing plane of Fig. 45. The full length of the resultant displacement can be obtained by turning point 497 about line 495—496 until it reaches the drawing plane at 497'. 495—497' is the true length of the displacement.

The motion along the profile tangent thus changes the rate of the displacement of the tool axis (465 or 485) somewhat. And it also changes the direction of the tool path. Both these changes can be constructed or computed as described.

Figure 43 and 44 illustrate the procedure with straight cutting edges 501, 521 of tools 500, 520 respectively.

Here the turning angle about the tilt axis is equal to the change in profile tilt, no matter where the tilt axis is. Any axis 505 on profile normal 506 requires a turning angle equal to the angular inclination of the profiles 501, 501'. Thus we may turn center 511 of edge round 512 about axis 505 (Fig. 43) through this angle, and thereby obtain a position $511_a$ of this center. As the edge round 512' should be tangent to the given depth line 502 at the large end of the teeth, the center $511_a$ is shifted in the direction of straight line 501 to a position 511', where this condition is fulfilled. Axis 505 then fulfills the depth requirement. It does so no matter where it lies on normal 506. Its position on normal 506 may be so determined, that the edge 501' passes exactly through point 412, as shown.

Ease-off can be applied either to the pinion or to the gear or to both. If ease-off lengthwise of the teeth is desired on the gear, then edge 501' should have a distance from point 412 equal to the ease-off desired on the gear. And the position of axis 505 on normal 506 is determined accordingly. During the tilt, axis 505 is proportionately displaced in the direction of edge 501 to a position 505'. This displacement 505—505' is equal to the displacement $511_a$—511'.

The same considerations apply for determining the position of the tilt axis 525 on normal 526 on the opposite side of the teeth, Fig. 44. Edge 521 reaches to a depth line 503. In position 521' it reaches to a depth line 502.

To attain the tooth dedenda indicated by lines 502, 503 the tools 500, 520 are moved in a direction inclined to the line of contact (404) of the hyperbolic pitch surfaces. The direction and the rate of tool translation is determined as described for tools 460, 480 with Fig. 45.

In a further embodiment a change of pressure angle along the teeth is attained without tilting the tool. This shape thus permits a particularly simple production. For details reference is made to my copending application Serial No. 557,151, filed January 3, 1956. For details of production where the tools are tilted as they cut, reference is made to my application Serial No. 573,034, filed March 21, 1956.

General

The invention comprises the twisted tooth shape for gears having angularly disposed and offset axes, that increases the load capacity of the tooth surfaces, and further the twisted tooth shape by itself. The term tooth is used to include threads. The twist of the tooth surfaces of a gear causes a tooth surface to differ from a surface of revolution extending along the root surface of the gear and having the same lengthwise curvature and direction at a mean point as the tooth surface.

The surface of revolution may be a conical surface, as used on conventional form-cut gears, tangent to the tooth surface at mean point 80 (Figs. 1 to 6), that is, having the same direction at that point. The said conical surface has the same lengthwise curvature at point 80 as the tooth surface, but the latter is inclined to the conical surface increasingly with increasing distance from the mean point. It is twisted relatively to the conical surface, and has an inclination to the root-surface normals and to the root surface that changes along the length of the teeth.

Looking along the teeth of the right hand gear shown in Figures 1 to 6, from either end of the teeth the twist is in a left hand direction from the near end to the far end of the teeth. This twist is like the turning motion of a left hand screw. This direction is also called counterclockwise direction.

Fig. 5 is a view of the sectional profiles from the outside. Looking from the outside, the section at the left is at the far end and the section at the right is at the near end. And it is noted that the section at the left is turned in a left hand direction as compared with the section at the right. This applies to both sides of the teeth, to the longitudinally convex side 106 and also to the longitudinally concave side 107.

On a left hand gear the twist is in a right hand direction from the outer end to the inner end of the teeth. It is like the turning motion of a right hand screw as it is turned to go in. This direction is also called clockwise direction.

Owing to this twist the tooth surface has a changing inclination to the root surface of the gear, and to the root surface normals.

The invention further comprises a twisted tooth shape whose tooth surfaces contain a line of constant profile shape all along their length and are the relative path of said line, and a tooth shape of this character that may be described by a form-cutting edge. It also comprises a tooth shape of this character that permits form-cutting both members of a gear pair having angularly disposed axes.

The invention applies equally well to fully conjugate teeth that mesh with full line contact with each other, and to teeth eased off slightly at their boundaries, as is customary in the art.

Further modifications may be made without departing from the spirit of the invention.

This application is intended to cover any variations, uses, or adaptations of the invention following, in general, the principles of the invention and including such departures from the present disclosure as come within the known or customary practice in the art to which the invention pertains and as may be applied to the essential features herein set forth and as fall within the scope of the invention or the limits of the appended claims.

I claim:

1. A pair of mating gears, each having side tooth surfaces inclined to its root surface, the inclination thereto changing along the length of the teeth of the respective gear and being larger at one end of the teeth than at the other end, each of the side tooth surfaces of one of said gears being a surface such as may be traced by a line of constant shape other than a line of contact with the mating side tooth surfaces of the mating gear, when said line of constant shape is moved in a straight path inclined to the direction of the axis of said one gear and is simultaneously tilted about an axis of fixed direction while said one gear rotates on its axis in timed relation to the displacement of said line of constant shape.

2. A pair of mating gears, each having side tooth surfaces inclined to its root surface, the inclination thereto changing along the length of the teeth of the respective gear and being larger at one end of the teeth than at the other end, each of the side surfaces of the teeth of one of said gears being a surface such as may be traced by a line of constant shape other than a line of contact between said side surfaces and the mating side tooth surfaces of the mating gear, when said line of constant shape is moved in a straight path inclined to the direction of the axis of said one gear and is simultaneously titlted about an axis extending in the direction of said path while said one gear is rotated in timed relation to the displacement of said line of constant shape.

3. Worm gearing comprising a throated worm, and a worm-gear conjugate thereto and adapted to transmit uniform motion between them, said worm and wormgear meshing in a surface of action inclined to the directions of the axes of said worm and wormgear, said surface extending at a constant distance, larger than the tooth depth, about an axis angularly disposed to and offset from said axes, said axis intersecting the center line of the worm and wormgear and lying in a plane parallel to said axes.

4. Wormgearing according to claim 3, wherein the axis, about which the surface of action extends, and the worm axis intersect the center line of the wormgearing on opposite sides of the intermeshing teeth, said axis having a larger distance from said teeth than the worm axis.

5. A pair of mating tapered gears having spiral teeth whose side tooth surfaces are adapted to contact one another and to transmit uniform motion between them, each side tooth surface of each of said gears being a surface such as may be traced by a line of constant shape moving relatively lengthwise of said side tooth surface, said line being inclined to the direction of the mean line of instantaneous contact of said tooth surface with the mating side tooth surfaces of the mating gear.

6. A pair of tapered gears, each having teeth projecting from a root surface and each having side tooth-surfaces inclined to its root surface, each of the side surfaces of one member of the pair having convex profiles and being the path of a line of constant shape moving along the length of the side tooth surface, said line having a larger inclination to the lengthwise direction of the side tooth surface than the mean line of contact of the side tooth surface with the mating tooth surfaces of the mating gear, the inclination of said side surfaces to the root surface normals changing along the length of the teeth, and increasing from the outer ends to the inner ends of the teeth.

7. A pair of gears having angularly disposed and offset axes, each of the side surfaces of the teeth of each member of said pair being the path of a line of constant shape moving along the length of the tooth, said line extending at a larger angle to the lengthwise direction of the teeth than the mean line of contact of the respective side tooth surface with the mating side tooth surfaces of the other member of the pair, and said line being inclined to the depthwise direction of the teeth, the inclination of said line thereto varying along the length of the teeth.

8. A pair of gears having angularly disposed and offset axes, each of the side surfaces of each tooth of each member of said pair being a surface traceable by a line of constant shape other than a line of instantaneous contact between mating side surfaces of the teeth of the pair, said line of constant shape extending at an angle to the lengthwise direction of the tooth and inclined to the depthwise direction of the tooth and moving lengthwise along the tooth, the inclination of said line to the depthwise direction of the tooth varying along the length of the tooth, and increasing on one side of the tooth from one tooth end to the other end while decreasing on the opposite side of the tooth.

9. A pair of gears having angularly disposed and offset axes, each of the side surfaces of each tooth of each member of said pair being a surface such as may be traced by a line of constant shape moving along the length of the tooth and rigid with a basic helical member that meshes with said pair, the axis of said basic member being offset from the region where the teeth of said gears interengage, said offset being larger than the depth of said teeth.

10. A pair of gears having angularly disposed axes, each of the side surfaces of each tooth of each member of said pair being a surface such as may be traced by a line of constant shape moving along the length of the tooth, said line being different on the two members and in the case of one of said members, being a straight line and having a varying inclination to the depthwise direction of the teeth of said one member.

11. A pair of gears having angularly disposed axes, each of the side surfaces of each tooth of each member of said pair being a surface such as may be traced by a line of constant shape moving along the length of the tooth, said line being inclined to the mean line of instantaneous tooth contact of the mating side surfaces of the two members of the gear pair and in the case of at least one of said members, when considered as lying in the side tooth surface being traced, being convex, and having a varying inclination to the depthwise direction of the teeth of said one member.

12. A pair of gears, each having teeth projecting from its root surface and each having side tooth-surfaces inclined to said root surface, the inclination thereto changing along the length of the teeth and being larger at one end of the teeth than at the other end, each of the side surfaces of one gear of the pair, at least, being a surface such as may be traced by a line of constant shape other than a contact line with mating side tooth surfaces of the mating gear, said line of constant shape moving in a straight path inclined to the direction of the gear axis while said one gear rotates on its axis in timed relation to the displacement of said line.

13. A pair of mating gears each having teeth projecting from its root surface and each having side tooth-surfaces inclined to its root surface, the inclination thereto changing along the length of the teeth and being larger at one end of the teeth than at the other end, each of the side surfaces of the teeth of one gear being a surface such as may be traced by a line of constant shape other than a line of contact between said side surfaces and the mating side tooth surfaces of the mating gear, moving in a straight path inclined to the direction of the gear axis and simultaneously tilting about an axis extending in the direction of said straight path.

14. A pair of gears having angularly disposed and offset axes, said gears being conjugate to a toothed member whose axis intersects the line of centers of said gear pair and whose teeth lie wholly inside of a zone coaxial with said member and bounded by cylindrical surfaces passing through the outer and inner ends respectively of a tooth profile of said member, the radius of the cylindrical surface which passes through said inner ends being larger than the depth of the teeth, the axis of said toothed member being inclined to the axes of both gears of said gear pair and being offset from both of said axes.

15. A pair of gears comprising a worm gear and a worm of the enveloping type, said gears being conjugate to a toothed member whose axis intersects the line of centers of said gear pair and whose teeth lie wholly inside of a zone coaxial with said member and bounded by cylindrical surfaces passing through the outer and inner ends respectively of the tooth profiles of said member, the radius of the cylindrical surface which passes through said inner end being larger than the depth of the teeth, the axis of said toothed member being inclined to the axes of both said gears and lying in a plane parallel to the last-named axes, and said gears being shaped to contact with one another successively along a surface of action that extends diagonally across the zone of intermeshing teeth at an angle to the directions of both axes of said gear pair.

References Cited in the file of this patent

UNITED STATES PATENTS

| | | |
|---|---|---|
| 1,816,272 | Wildhaber | July 28, 1931 |
| 2,311,006 | Trbojevich | Feb. 16, 1943 |
| 2,338,367 | Trbojevich | Jan. 4, 1944 |